United States Patent Office 3,060,144
Patented Oct. 23, 1962

3,060,144
COATING COMPOSITIONS COMPRISING A BLEND OF AN ALKYLOLATED ACRYLAMID-EPOXIDE CONDENSATION PRODUCT AND A NORBORNENE-ACRYLIC COPOLYMER
Norman G. Gaylord, New Providence, N.J., assignor to Interchemical Corporation, New York, N.Y., a corporation of Ohio
No Drawing. Filed Feb. 26, 1960, Ser. No. 11,137
18 Claims. (Cl. 260—33.4)

This invention relates to new thermosetting coating compositions. More particularly, it relates to new thermosetting coating compositions comprising blends of low molecular weight organic solvent soluble acrylic copolymers and new resins formed by the alkylolation of the condensation products of acrylamides and epoxy resins. These coating compositions, when cured yield durable surface coatings which are very hard, exhibit an excellent resistance to scratching, staining, washing and weathering and have high gloss and flexibility.

Copending application, Serial Number 768,839, filed October 22, 1958, now U.S. Patent 2,985,611, discloses a new low molecular weight organic solvent soluble acrylic copolymer formed by the addition polymerization of a non-allylic alcohol containing the norbornene nucleus, at least one alkyl ester of acrylic or methacrylic acid, the alkyl group of which contains from 1 to 8 carbons and an optional amount of certain monomers which include acids such as acrylic and methacrylic; nitriles, such as acrylonitrile and methacrylonitrile; vinyl esters, such as vinyl acetate, vinyl propionate and vinyl stearate; esters of unsaturated dibasic acids, such as dimethyl maleate and dibutyl fumarate; styrene, alpha-methyl styrene, and the various vinyl toluenes; amides, such as acrylamide, methacrylamide, methylolacrylamide, and methylol-methacrylamide; hydroxy compounds such as ethylene glycol monoacrylate or monomethacrylate, glycerol monoacrylate or monomethacrylate or glycerol allyl ether; and vinyl alkyl ethers such as vinyl butyl ether, vinyl ethyl ether, vinyl hexyl ether, etc.

It has now been discovered that when these norbornene containing acrylic copolymers are blended with the new alkylolated acrylamide epoxide condensation products of this invention in volatile organic solvent, a novel thermosetting composition is formed which has excellent hardness and flexibility properties in addition to a high gloss and a very good resistance to scratching, weathering and washing. These compositions are particularly suited to coatings for household appliances. The compositions in these blends have unusual pigment-wetting power, which makes easy the dispersion of pigments such as carbon black, titanium dioxide and phthalocyanines in vehicles containing these copolymers.

The novel alkylolated acrylamide-epoxide condensation products comprise the reaction products of aldehydes and the condensation products of copolymers containing acrylamides and at least one other ethylenically unsaturated monomer with epoxy or epoxide resins.

The acrylamide containing copolymers used in this invention may be prepared by any of the conventional methods well known to those skilled in the art. U.S. Patent No. 2,173,005, issued September 12, 1939, to Daniel E. Stain, gives one process for preparing acrylamide containing copolymers. Acrylamide monomers may be copolymerized with a wide variety of ethylenically unsaturated monomers including acrylic or methacrylic acids and their esters particularly methyl acrylate, ethyl acrylate, butyl acrylate, hexyl acrylate and octyl acrylate; nitriles of acrylic and methacrylic acids; vinyl halides; styrene and vinyl toluene; maleic acid and esters thereof; vinyl ethers, vinyl ketones, particularly methyl vinyl ketone; dibutyl maleate; vinyl pyridines; 2-chlorobutadiene-1,3 etc. It will be obvious to those skilled in the art that mixtures of the above monomers may be copolymerized with acrylamide monomers to give copolymers of widely varying properties. In other words by the proper selection of monomers and proportions, acrylamide containing copolymers may be made to have specific hardness and flexibility characteristics. In the practice of this invention, it is preferred to use acrylamide copolymers containing substantial amounts of either styrene or vinyl toluene and ethyl acrylate or methyl methacrylate. The proportions are not critical. It is also preferable to include small quantities of methacrylic or acrylic acid.

In producing the alkylolated acrylamide-epoxide condensation product of this invention, the acrylamide monomer is first copolymerized with the other ethylenically unsaturated monomers. The resulting acrylamide containing copolymer is then condensed with an epoxide resin. Finally the aldehyde is reacted with the condensation product.

The entire reaction is preferably conducted in solution. The selected solvent must be one in which the acrylamide, the ethylenically unsaturated monomers, the epoxide resin and the aldehyde are soluble. Aliphatic alcohols as methanol, ethanol and butanol are preferable as solvents with butanol being the most preferable of these. Ethylene glycol monobutyl ether and acetone may also be used as solvents either alone or in combination with other solvents. It should be noted that the preferred solvents may be cut or mixed with aromatic hydrocarbon solvents such as xylene. The copolymerization of the monomers to form the acrylamide copolymer is initiated by "catalysts" or polymerization initiators of the free radical type. The most commonly used initiators are azo compounds and organic peroxygen compounds. Typical of the azo compounds that may be used for this purpose are azobisisobutyronitrile, and azobisisovaleronitrile. Typical of the organic peroxygen compounds that may advantageously be used as copolymerization initiators are such compounds as cumene hydroperoxide, tertiary butyl perbenzoate, peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct, and cyclohexanone-hydrogen peroxide adduct.

It is desirable that the acrylamide copolymers have a low molecular weight in order to insure solubility thereof in the solvents used for the coatings compositions of this invention. Accordingly, it is preferable to add "chain stoppers" during the polymerization of the acrylamide copolymer. Mercaptans such as dodecyl mercaptans, hexyl mercaptans and octyl mercaptans are conventionally used.

The epoxy resins condensed with the acrylamide copolymers are conventionally prepared by reacting a polyhydric phenol particularly Bisphenol A with epichlorohydrin. By regulating the proportions of these two reactants the molecular size and the molecular structure of the epoxy resins may be controlled. By using an excess of epichlorohydrin, the lower molecular weight epoxy resins are produced. By increasing the amount of Bisphenol A used, higher molecular weight epoxy resins are produced. In the practice of the invention, it is preferable to employ epoxy resins having molecular weights below 900. The most preferable epoxy resin is one having a molecular weight of 850–900, an epoxide equivalent weight of 450 and a hydroxyl equivalent weight of 145.

While there are no critical limitations on the proportions of epoxy resin condensed with the acrylamide copolymer, best results are obtained when the epoxy resin added amounts to 10% or less based upon solids content of the total weight of the reactants. It is most preferable to condense about 5% by weight of epoxy resin with the remainder being acrylamide copolymer. The condensation reaction is preferably catalyzed by a catalyst such as triethylamine.

While formaldehyde is used in methylolating the condensation product, it will be obvious that other aldehydes may be used to alkylolate the condensation product. Such alternative aldehydes, which are set forth in the aforementioned U.S. Patent 2,173,005, include acetaldehyde, propionaldehyde, butyraldehyde and isobutyraldehyde. While not critical, it is preferable to react 2 equivalents of formaldehyde for every 1 equivalent of acrylamide in the copolymer.

It should be noted that in the case the reactions are conducted in alkanol solvents such as butanol in the present case, the alkylol groups or methylol groups on the final product become, by etherification, alkoxyalkyl groups. In the case where formaldehyde is used in butanol, the condensation product contains a butoxymethyl group.

The norbornene nucleus containing acrylic copolymers which are blended with the butylated methylolated acrylamide-epoxy resin condensation products are defined in copending application, Serial Number 768,839, filed October 22, 1958, now U.S. Patent 2,985,611, as the solution polymerization product of a mixture of monomers comprising (1) a minor portion of a non-allylic alcohol containing the norbornene nucleus, (2) a major proportion of an ester or a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5–30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture an optional amount of certain modifiers in amount about 2–35%. These modifiers have already been listed hereinabove.

With respect to the non-allylic alcohols containing the norbornene nucleus it should be noted that norbornene has the formula:

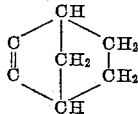

While for the purposes of describing the present invention, reference will be made mostly to copolymers of 2-hydroxymethyl-5-norbornene which has the following structure

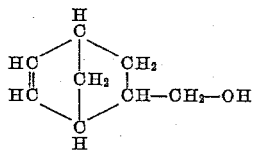

it will be understood that related homologs can readily be used and it is intended that the appended claims will cover the use of such compounds.

2-hydroxymethyl-5-norbornene is readily prepared by reacting allyl alcohol with cyclopentadiene (U.S. Patents No. 2,596,279 and No. 2,352,606). Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

These acrylic copolymers are prepared in solution by addition polymerization initiated by conventional free radical type initiators which have been described fully hereinabove. Benzoyl peroxide is preferably used as an initiator in the polymerization. Xylene is preferably used as the solvent although other conventional solvents such as benzene, ethyl benzene or toluene may be used.

In a further embodiment of this invention epoxy resin-acrylic graft copolymers which are more fully described in copending application Serial No. 808,887, April 24, 1959, may be used in place of the acrylic copolymers. These graft copolymers are prepared by the above described method for preparing the norbornene nucleus containing acrylic copolymers and using the same ingredients except that said monomers are polymerized by addition polymerization in the presence of epoxy resins.

The epoxy resins used in the graft copolymers are conventionally prepared by reacting a polyhydric phenol, particularly Bisphenol A with epichlorohydrin. By regulating the proportions of these two reactants, the molecular size and the molecular structure of the ethoxyline resins produced may be controlled. By using an excess of epichlorohydrin, a low molecular weight ethoxyline resin is produced. By increasing the amount of Bisphenol A used, higher molecular weight epoxy resins are produced. In the preparation of these graft copolymers, it is preferable to use epoxy resins having molecular weights of 350 to 875, epoxide equivalent weights of 175 to 525 and an average of 1.7 to 1.9 epoxides per molecule. We have found best results are secured when epoxy resins having a molecular weight of 875, an epoxide equivalent weight of 485 and an average of 1.7 to 1.9 epoxide groups per molecule are used. One available commercial resin having these properties is "Epon 1001" an epoxy resin having the structure:

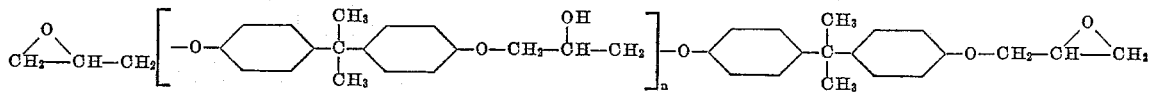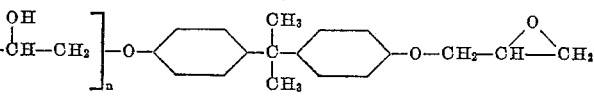

and an average molecular weight of 875, an epoxide equivalent weight of 450–525, a hydroxyl equivalent weight of 145 and from 1.7 to 1.9 epoxy groups per molecule. (See Shell Chemical Corporation Bulletin SC: 52–31 "Epon Resins for Surface Coatings," pp. 6 and 7, published 1952.) While it is not critical, it is preferred to have the epoxy resin constitute 9 to 37% parts by weight of the total starting reactants in the preparation of the graft copolymer.

Solutions of the alkoxyalkylated acrylamide-epoxy resin condensation products are blended with solutions of the acrylic copolymers. While not critical, it is preferred that the resins be blends in the ratio of 6–7 parts by weight on a solids basis of "acrylamide-epoxy" resin, for every 3 to 4 parts of acrylic resin. It should be noted that as the "acrylamide-epoxy" resin is preferably in a solution comprising a 1:1 ratio of butanol-xylene and the acrylic is preferably in a xylene solution, the amount of xylene in the final coating solution will often exceed the butanol present. Since acrylamides are difficulty soluble in xylene, the "acrylamide-epoxy" resin may display a tendency to come out of solution if the amount of xylene present becomes too great. If this occurs, the resin may be restored into solution by the addition of butanol.

The following examples will illustrate the practice of this invention:

*Example 1*

|   |   | G. |
|---|---|---|
| (A) | Acrylamide | 180 |
| (B) | Butanol | 600 |
| (C) | Styrene | 900 |

Example 1—Continued

|   |   | G. |
|---|---|---|
| (D) | Ethyl acrylate | 84 |
| (E) | Methacrylic acid | 36 |
| (F) | Xylene | 600 |
| (G) | Cumene hydroperoxide | 12 |
| (H) | tert-Dodecyl mercaptan | 12 |
| (I) | tert-Butyl perbenzoate | 12 |
| (J) | tert-Butyl perbenzoate | 6 |
| (K) | Epon 1001 [1] | 44.4 |
| (L) | Triethylamine | 0.2 |
| (M) | Butyl Formcel [2] | 380 |

[1] Epon 1001 is an epoxy resin having a molecular weight of 875, an epoxide equivalent weight of 485 and an average of 1.7 to 1.9 epoxide groups per molecule.
[2] Butyl Formcel is a 40% solution of formaldehyde in butanol.

A is dissolved in B by heating and agitation and C, D, E, F, G and H are added and the mixture is heated to reflux at 120° C. Refluxing is continued for 1 hour and I is added. After refluxing for 3 additional hours, J is added. Refluxing is continued for 2 additional hours and K and L are added. Refluxing is continued for another hour and M is added. Refluxing is continued for 3 hours while the water of condensation is azeotropically distilled. The product has a solids content of 45.9% by weight and viscosity of V+ on the Gardner-Holt Scale.

Example 2

|   |   | G. |
|---|---|---|
| (A) | Vinyl toluene | 93.75 |
| (B) | Ethyl acrylate | 8.75 |
| (C) | Methacrylic acid | 3.75 |
| (D) | Acrylamide | 18.75 |
| (E) | Butanol | 62.5 |
| (F) | Xylene | 62.5 |
| (G) | Cumene hydroperoxide | 1.25 |
| (H) | tert-Dodecyl mercaptan | 1.25 |
| (I) | tert-Dodecyl mercaptan | 1.25 |
| (J) | tert-Butyl perbenzoate | .62 |
| (K) | Epon 1001 | 4.6 |
| (L) | Triethylamine | 0.2 |
| (M) | Butyl Formcel | 39.0 |

Items A, B, C, D, E, F, G and H are mixed and heated to reflux at 123° C. for one hour, after which I is added and refluxing is continued for 3 hours. J is then added and refluxing is continued for 2 hours. K and L are added and refluxing is continued at 114° C. for 1 hour, after which M is added and refluxing is continued for 3 hours while the water of condensation is azetropically distilled. The product has a solids content of 46.8% by weight and a Gardner-Holt viscosity of X-Y.

Example 3

|   |   | G. |
|---|---|---|
| (A) | Styrene | 500.0 |
| (B) | Ethyl acrylate | 320.0 |
| (C) | Methacrylic acid | 30.0 |
| (D) | Acrylamide | 150.0 |
| (E) | Butanol | 500.0 |
| (F) | Xylene | 500.0 |
| (G) | Cumene hydroperoxide | 10.0 |
| (H) | tert-Dodecyl mercaptan | 10.0 |
| (I) | tert-Butyl prebenzoate | 5.0 |
| (J) | Epon 1001 | 69.0 |
| (K) | Triethylamine | 0.34 |
| (L) | Butyl Formcel | 318.0 |

A, B, C, D, E, F, G and H are mixed and heated to reflux at 115° C. and maintained at reflux for 4 hours, after which I is added and reflux is continued for 2 hours. J and K are added and the mixture is maintained at reflux at 114° C. for one hour. L is added and refluxing is continued for 3 hours while the water of condensation is azeotropically distilled. The product has a solids content of 42% by weight and a Gardner-Holt viscosity of Z2–Z3.

Example 4

|   | G. |
|---|---|
| Vinyl toluene | 1200.0 |
| Ethyl acrylate | 112.0 |
| Methacrylic acid | 48.0 |
| Group (A): | |
|   Acrylamide | 240.0 |
|   Butanol | 800.00 |
|   Xylene | 800.0 |
|   Cumene hydroperoxide | 16.0 |
|   tert-Dodecyl mercaptan | 30.0 |
| (B) tert-Butyl perbenzoate | 8.0 |
| Group (C): | |
|   Epon 1001 | 42.5 |
|   Triethylamine | 0.20 |
| (D) Butyl Formcel | 150.0 |

Group A is heated to reflux at approximately 122° C. and maintained at said level for 4 hours. B is added and heating at reflux is continued for 2 more hours. The total solids content after the 6 hour reaction period is 46.6% by weight. To 2350 g. of the reaction product group C is added and a reflux temperature of 114° C. is maintained for 1 hour. To 1000 g. of the resulting mixture, D is added and water is removed by azeotropic distillation for 3 hours. The final solids content is 51.4% by weight.

Example 5

|   |   | G. |
|---|---|---|
| (A) | 2-hydroxymethyl-5-norbornene | 88.0 |
| (B) | Xylene | 246.9 |
| (C) | Butyl acrylate | 362.0 |
| (D) | Methyl methacrylate | 21.4 |
| (E) | Methacrylic acid | 21.4 |
| (F) | Xylene | 246.9 |
| (G) | Benzoyl peroxide | 9.9 |
| (H) | Benzoyl peroxide | 2.5 |

To a mixture of A and B maintained at 90° C., a mixture of C, D, E, F and G is added dropwise over a period of 1½ hours with continual stirring under a nitrogen atmosphere. The mixture is maintained at 90° C. for 1½ hours, after which H is added. The mixture is then heated at 90° C. for 1½ additional hours and at 125° C. for 1 hour. The product has a solids content of 45.4% by weight indicating a 90.8% conversion of monomers to copolymers.

Example 6

|   |   | G. |
|---|---|---|
| (A) | 2-hydroxymethyl-5-norbornene | 324 |
| (B) | Xylene | 900 |
| (C) | Butyl acrylate | 1320 |
| (D) | Methyl methacrylate | 78 |
| (E) | Methacrylic acid | 78 |
| (F) | Xylene | 900 |
| (G) | Benzoyl peroxide | 36 |
| (H) | Benzoyl peroxide | 9 |

A and B are mixed and heated to 90° C. under a nitrogen atmosphere. C, D, E, F, and G are added over a period of 2½ hours while the temperature is maintained at 90° C. The mixture is maintained at 90° C. for another ½ hour at which time, H is added. The mixture is then maintained at 90° C. for an additional 1½ hours and then maintained at 125° C. for 1 hour. The product has a 44.7% solids content by weight indicating a 89.4% conversion of monomer to polymer.

Example 7

|   |   | G. |
|---|---|---|
| (A) | 2-hydroxymethyl-5-norbornene | 135.0 |
| (B) | Xylene | 450.0 |
| (C) | Ethyl acrylate | 675.0 |
| (D) | Methacrylic acid | 90.0 |

Example 7—Continued

| | G. |
|---|---|
| (E) Xylene | 450.0 |
| (F) Benzoyl peroxide | 18.0 |
| (G) Benzoyl peroxide | 4.5 |
| (H) Benzoyl peroxide | 4.5 |
| (I) Benzoyl peroxide | 4.5 |

A and B are heated under a nitrogen atmosphere to 90° C. at which time, C, D, E, and F are added dropwise over a period of 1½ hours under continual stirring while the mixture is maintained at 90° C. After an additional 1½ hours at 90° C., G is added. The mixture is maintained at 90° C. for 3 additional hours and H is added. After another 3 hours at 90° C., I is added. The mixture is then maintained at 90° C. for 3 hours, after which, the temperature is raised to and maintained at 125° C. for an additional hour. The product has a solids content of 46.4% by weight indicating a 92.8% conversion of monomers to polymer.

Example 8

| | G. |
|---|---|
| (A) 2-hydroxymethyl-5-norbornene | 90.0 |
| (B) Xylene | 450.0 |
| (C) Butyl acrylate | 315.0 |
| (D) Methyl methacrylate | 270.0 |
| (E) Ethyl hexyl acrylate | 180.0 |
| (F) Methacrylic acid | 45.0 |
| (G) Xylene | 450.0 |
| (H) Benzoyl peroxide | 18.0 |
| (I) Benzoyl peroxide | 4.5 |
| (J) Benzoyl peroxide | 4.5 |

To a mixture of A and B maintained at 90° C., a mixture of C, D, E, F, G and H is added dropwise over a period of 1½ hours under continual stirring and under a nitrogen atmosphere. The mixture is maintained at 90° C. for 1½ additional hours, at which time I is added and the mixture maintained at 90° C. for 3 more hours. J is added and the mixture is maintained at 90° C. for 3 hours and then heated to and maintained at 125° C. for 1 hour. The product has a 46.3% solids content by weight indicating a 92.6% conversion of monomers to polymer.

Example 9

| | G. |
|---|---|
| (A) Epon 1001 | 450 |
| (B) 2-hydroxymethyl-5-norbornene | 270 |
| (C) Xylene | 750 |
| (D) Butyl acrylate | 1100 |
| (E) Methyl methacrylate | 65 |
| (F) Methacrylic acid | 65 |
| (G) Xylene | 750 |
| (H) Benzoyl peroxide | 30 |
| (I) Benzoyl peroxide | 7.5 |

A, B, and C are heated to 90° while continually stirring under a nitrogen atmosphere. D, E, F, G and H are mixed and the mixture is added dropwise to the A, B and C mixture over a period of 2½ hours while the temperature is maintained at 90° C. The mixture is maintained at 90° C. for ½ hour and I is added. The mixture is maintained at 90° C. for 1½ hours after which the mixture is raised to 125° C. and maintained at that temperature for 1 hour. The solids content of the product is 54.4% by weight.

Example 10

7 parts by weight of the polymer of Example 1 are blended with 3 parts of the polymer of Example 5 and the resulting blend is drawn down on a steel panel and baked at 350° F. for 30 minutes. The resulting film is clear and shows a good cure, high gloss, excellent flexibility and hardness.

The following blends are prepared:

| Example | Polymer Produced in | Parts by Weight | Polymer Produced in | Parts by Weight |
|---|---|---|---|---|
| 11 | Example 1 | 6 | Example 6 | 4 |
| 12 | Example 2 | 6 | Example 7 | 4 |
| 13 | Example 3 | 7 | Example 8 | 3 |
| 14 | Example 1 | 7 | do | 3 |
| 15 | Example 2 | 6 | Example 5 | 4 |
| 16 | Example 3 | 7 | do | 3 |
| 17 | Example 1 | 7 | Example 9 | 3 |
| 18 | Example 4 | 7 | do | 3 |

Each of the blends are drawn down on a steel panel and baked in accordance with the procedure of Example 10. The cured films of Examples 11–15, 17 and 18 are comparable with the film of Example 10 in all properties. The cured films of Example 15 display properties equivalent to those of Example 10, except that the film is not completely clear, having a slight haze.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:

1. A thermosetting composition comprising (A) the reaction product of (1) a lower molecular weight aliphatic monoaldehyde with (2) the product of the condensation of a copolymer comprising an acrylamide and at least one other ethylenically unsaturated monomer with an epoxy resin formed by the reaction of epichlorohydrin and Bisphenol A having an average molecular weight of 875, an epoxide equivalent weight of 450–525 and a hydroxyl equivalent weight of 145 and (B) an acrylic copolymer made by the addition polymerization of a mixture of monomers comprising from 5% to 30% by weight of a nonallylic alcohol containing the norborene nucleus, and from 60% to 90% by weight of an ethylenically unsaturated ester material having the formula

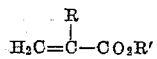

in which R is a member of the group consisting of hydrogen, methyl and ethyl radical, and R' is an alkyl radical containing from 1 to 8 carbon atoms, and up to 35% by weight of methacrylic acid.

2. A thermosetting composition as defined in claim 1, wherein said acrylic copolymer further includes 9% to 37% by weight of an epoxy resin having the formula

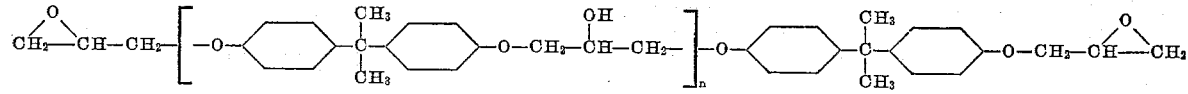

where n is an integer from 0 to 2.

3. A thermosetting composition according to claim 1, wherein said acrylic copolymer comprises the copolymerization product of 2-hydroxymethyl-5-norbornene, butyl acrylate, methyl methacrylate and methacrylic acid.

4. The thermosetting composition defined in claim 3, which further includes 9% to 37% by weight of an epoxy resin having the formula

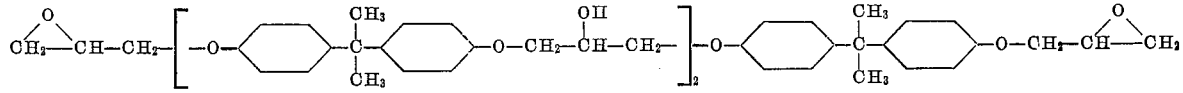

5. A thermosetting composition according to claim 1, wherein said acrylic copolymer comprises the copolymerization product of 2-hydroxymethyl-5-norbornene, ethyl acrylate and methacrylic acid.
6. A thermosetting composition according to claim 1, wherein said acrylamide containing copolymer comprises acrylamide, styrene, ethyl acrylate and methacrylic acid.
7. A thermosetting composition according to claim 1, wherein said acrylamide containing copolymer comprises acrylamide, vinyl toluene, ethyl acrylate and methacrylic acid.
8. A thermosetting composition according to claim 1, wherein said aldehyde is formaldehyde.
9. A thermosetting composition according to claim 1, wherein said reaction product of the aldehyde and said condensation product is butylated.
10. A heat curable surface coating composition comprising a solution of the blend claimed in claim 1 in a volatile organic solvent comprising xylene and butanol.
11. A heat curable surface coating composition comprising a solution of the blend claimed in claim 2 in a volatile organic solvent comprising xylene and butanol.
12. A heat curable surface coating composition comprising a solution of the blend claimed in claim 3 in a volatile organic solvent comprising xylene and butanol.
13. A heat curable surface coating composition comprising a solution of the blend claimed in claim 4 in a volatile organic solvent comprising xylene and butanol.
14. A heat curable surface coating composition comprising a solution of the blend claimed in claim 5 in a volatile organic solvent comprising xylene and butanol.
15. A heat curable surface coating composition comprising a solution of the blend claimed in claim 6 in a volatile organic solvent comprising xylene and butanol.
16. A heat curable surface coating composition comprising a solution of the blend claimed in claim 7 in a volatile organic solvent comprising xylene and butanol.
17. A heat curable surface coating composition comprising a solution of the blend claimed in claim 8 in a volatile organic solvent comprising xylene and butanol.
18. A heat curable surface coating composition comprising a solution of the blend claimed in claim 9 in a volatile organic solvent comprising xylene and butanol.

References Cited in the file of this patent
UNITED STATES PATENTS
2,890,202  Parker _____ June 9, 1959